United States Patent
Austin, III et al.

(10) Patent No.: US 9,839,332 B2
(45) Date of Patent: Dec. 12, 2017

(54) HARDWARE MOUNTING BRACKET, ASSEMBLY AND HARDWARE

(71) Applicant: LIBERTY HARDWARE MFG. CORP., Winston-Salem, NC (US)

(72) Inventors: James Allen Austin, III, Highpoint, NC (US); William Homer Spencer, Burlington, NC (US); Song Jian Lin, Shenzhen (CN); Liao Chun Lei, DongGuang (CN)

(73) Assignee: LIBERTY HARDWARE MFG. CORP., Winston-Salem, NC (US)

( * ) Notice: Subject to any disclaimer, the term of this patent is extended or adjusted under 35 U.S.C. 154(b) by 0 days.

(21) Appl. No.: 13/835,019

(22) Filed: Mar. 15, 2013

(65) Prior Publication Data
US 2014/0026392 A1   Jan. 30, 2014

Related U.S. Application Data

(63) Continuation-in-part of application No. 13/557,585, filed on Jul. 25, 2012, now abandoned.

(51) Int. Cl.
*A47K 10/04* (2006.01)
*A47K 10/10* (2006.01)
(Continued)

(52) U.S. Cl.
CPC ............. *A47K 10/10* (2013.01); *A47K 10/04* (2013.01); *F16M 11/041* (2013.01);
(Continued)

(58) Field of Classification Search
CPC ........ A47H 1/142; A47K 10/04; A47K 10/14; A47K 2201/00; A47K 2201/02; A47K 2201/025; A47K 10/10
(Continued)

(56) References Cited

U.S. PATENT DOCUMENTS 2,587,912 A    3/1952 Simpson
2,693,927 A *  11/1954 Gardner ........................ 248/263
(Continued)

FOREIGN PATENT DOCUMENTS

CN   201891709 U   7/2011

OTHER PUBLICATIONS

Mexican Office Action for corresponding Application No. MX/a/2013/008574, dated Aug. 25, 2015, 4 pages.
(Continued)

*Primary Examiner* — Stanton L Krycinski
*Assistant Examiner* — Guang H Guan
(74) *Attorney, Agent, or Firm* — Brooks Kushman P.C.; Lora Graentzdoerffer

(57) ABSTRACT

A hardware mounting bracket is provided with a bracket body adapted to be mounted to a support surface. A rigid retainer is provided on one end of the bracket body to receive hardware supported thereon. At least one elongate biasing retainer is provided on another end of the bracket body spaced apart from the rigid retainer, to engage hardware supported thereon and to provide a loaded surface contact with hardware supported thereon. A hardware mounting assembly, hardware for mounting to a support surface, and method for mounting hardware are also provided.

18 Claims, 6 Drawing Sheets

(51) Int. Cl.
*F16M 13/02* (2006.01)
*F16M 11/04* (2006.01)
*F16B 9/02* (2006.01)
*F16B 13/02* (2006.01)

(52) U.S. Cl.
CPC ......... *F16M 13/02* (2013.01); *A47K 2201/00* (2013.01); *A47K 2201/02* (2013.01); *A47K 2201/025* (2013.01); *F16B 9/023* (2013.01); *F16B 13/02* (2013.01); *Y10T 29/49947* (2015.01)

(58) Field of Classification Search
USPC ............ 211/6, 16, 88.04, 105.1, 105.2, 123; 4/576.1, 571.1, 611; 248/475.1, 489, 497, 248/220.21, 220.22, 221.11, 222.11, 248/222.14, 223.41, 225.11, 231.91, 248/309.1, 310; 267/260, 263, 36.1, 53, 267/228, 229; 411/34, 38, 400; 24/457, 24/458
See application file for complete search history.

(56) References Cited

U.S. PATENT DOCUMENTS

| | | | | |
|---|---|---|---|---|
| 3,036,803 | A * | 5/1962 | Fiebelkorn | A47K 10/10 248/221.11 |
| 3,495,799 | A * | 2/1970 | Murgas | B60R 1/078 248/475.1 |
| 3,516,635 | A * | 6/1970 | De Niet | A47B 57/54 108/106 |
| 3,596,861 | A | 8/1971 | Baldini | |
| 4,718,625 | A * | 1/1988 | Boda | 248/222.11 |
| 4,979,713 | A * | 12/1990 | Bell | A47K 10/10 248/221.11 |
| 5,121,893 | A * | 6/1992 | King et al. | 248/251 |
| 5,377,948 | A * | 1/1995 | Suman et al. | 248/549 |
| 5,816,308 | A | 10/1998 | De Hoyos | |
| D402,271 | S * | 12/1998 | Weinberg | D13/177 |
| 6,120,000 | A * | 9/2000 | Aeschbach et al. | 248/694 |
| 6,146,159 | A * | 11/2000 | Brunker | H01R 13/447 174/66 |
| 6,199,808 | B1 | 3/2001 | Lin | |
| 6,520,463 | B1 * | 2/2003 | Ouano | 248/222.13 |
| 6,796,442 | B1 | 9/2004 | Wu | |
| 7,503,534 | B2 * | 3/2009 | Pollack | 248/201 |
| 7,641,161 | B2 | 1/2010 | Bauer | |
| 7,703,500 | B2 * | 4/2010 | Wen et al. | 160/84.05 |
| 7,845,103 | B2 * | 12/2010 | Logan | G09F 7/18 24/573.09 |
| 8,430,367 | B2 * | 4/2013 | Tu | G11B 33/126 248/220.21 |
| 8,430,369 | B2 * | 4/2013 | Hsu | A47K 10/04 211/105.1 |
| 8,651,442 | B2 * | 2/2014 | Takaya | H02B 1/052 248/225.21 |
| 9,339,153 | B1 * | 5/2016 | Chang | A47K 10/12 |
| 2009/0108157 | A1 | 4/2009 | Spencer | |
| 2011/0302865 | A1 * | 12/2011 | Kliegle et al. | 52/483.1 |
| 2012/0067837 | A1 | 3/2012 | He et al. | |
| 2012/0168583 | A1 * | 7/2012 | Hsu et al. | 248/222.14 |
| 2014/0026392 | A1 * | 1/2014 | Austin, III | F16M 13/02 29/525.01 |
| 2014/0026402 | A1 * | 1/2014 | Austin, III | F16M 13/02 29/700 |

OTHER PUBLICATIONS

Eva™ Technical Specification, "18" & 24" Towel Bar YB2818 & YB2824", Copyright Creative Specialties International 2006, 1 page.
Mexican Office Action for corresponding Application No. MX/a/2013/008574, dated Feb. 25, 2016, 6 pages.

* cited by examiner

HARDWARE MOUNTING BRACKET, ASSEMBLY AND HARDWARE

CROSS-REFERENCE TO RELATED APPLICATIONS

This application is a continuation-in-part of U.S. application Ser. No. 13/557,585 filed Jul. 25, 2012, the disclosure of which is incorporated in its entirety by reference herein.

TECHNICAL FIELD

Various embodiments relate to hardware to mount to a support surface; hardware mounting assemblies to mount the hardware; hardware mounting brackets; and methods for installing hardware.

BACKGROUND

Hardware, such as hooks, towel bars, toilet paper roll bars, lighting towel rings, rope hooks, shelving, and the like, are typically mounted to a support surface, such as a wall. The prior art has provided various brackets, assemblies, hardware, and methods for mounting hardware to walls.

SUMMARY

According to at least one embodiment, a hardware mounting bracket is provided with a bracket body adapted to be mounted to a support surface. A rigid retainer is provided on one end of the bracket body to receive hardware supported thereon. At least one elongate biasing retainer is provided on another end of the bracket body spaced apart from the rigid retainer, to engage hardware supported thereon and to provide a loaded surface contact with hardware supported thereon.

According to at least another embodiment, a hardware mounting assembly is provided with a hardware mounting bracket with a bracket body adapted to be mounted to a support surface. A rigid retainer is provided on one end of the bracket body to receive hardware supported thereon. At least one elongate biasing retainer is provided on another end of the bracket body spaced apart from the rigid retainer, to engage hardware supported thereon and to provide a loaded surface contact with hardware supported thereon. An aperture is formed in the bracket body. A fastener extends through the aperture to fasten the hardware mounting bracket to the support surface.

According to at least another embodiment, a hardware assembly is provided with a hardware mounting assembly with a hardware mounting bracket with a bracket body adapted to be mounted to a support surface. A rigid retainer is provided on one end of the bracket body to receive hardware supported thereon. At least one elongate biasing retainer is provided on another end of the bracket body spaced apart from the rigid retainer, to engage hardware supported thereon and to provide a loaded surface contact with hardware supported thereon. An aperture is formed in the bracket body. A fastener extends through the aperture to fasten the hardware mounting bracket to the support surface. A hardware mounting base has a cavity to receive the bracket body, with a first recess formed within the base sized to receive the rigid retainer, and a second recess formed within the base sized to receive the at least one biasing retainer, to mount the hardware base to the hardware mounting assembly and to conceal the hardware mounting assembly.

According to at least one embodiment, a hardware mounting bracket is provided with a bracket body adapted to be mounted to a support surface. A rigid retainer is provided on one end of the bracket body to receive hardware supported thereon. At least one elongate biasing retainer is provided on another end of the bracket body spaced apart from the rigid retainer, to directly engage hardware supported thereon.

According to yet another embodiment, a method to mount hardware to a wall, fastens a bracket body to a wall. Hardware is placed upon a first retainer on the bracket body. The hardware is pressed against the bracket body so that at least one elongate biasing retainer on the bracket body is received within a retention slot in the hardware.

DETAILED DESCRIPTION

Figure 1:
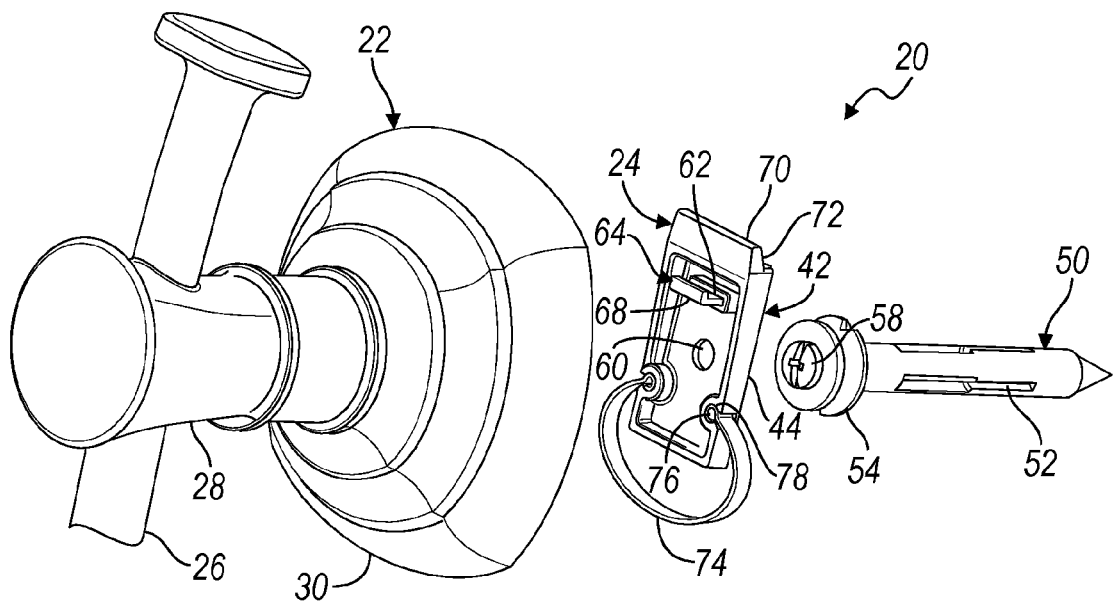
FIG. 1 is an exploded perspective view of a hardware assembly according to an embodiment.
Figure 2:
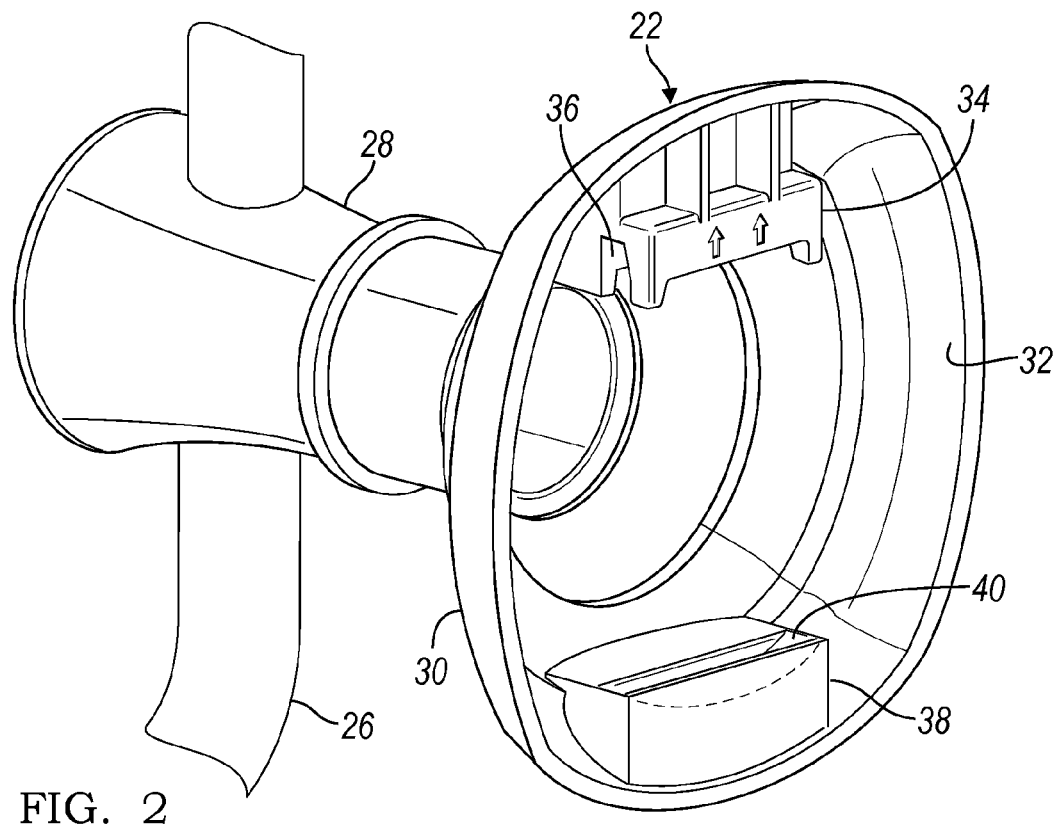
FIG. 2 is a rear perspective view of a base of the hardware assembly of FIG. 1.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference now to FIGS. 1-5, a hardware assembly 20 is illustrated according to an embodiment. The hardware assembly 20 includes hardware 22 and a hardware mounting assembly 24. The hardware 22 depicted includes a hook 26 with a post 28 and a base 30. The hardware mounting assembly 24 is employed for mounting the hardware 22 to a support surface, such as a wall, for example a generally planar wall. Of course, various support surfaces are contemplated. The hook 26 may be mounted to the support surface for hanging a towel, a bathrobe, a clothing hanger or the like. Although the hook 26 is illustrated, various domestic and commercial hardware is contemplated, such as a towel bar, a toilet paper roll bar, towel rings, rope hooks, lighting, shelving, and the like.

Referring to FIGS. 2-5, the base 30 has a cavity 32 formed therein for receiving and concealing the hardware mounting assembly 24. The base 30 includes a first receptacle 34 with a recess 36 which is generally tapered in a depth direction, while have a generally consistent cross-section for providing a flat retention feature facing centrally relative to the base 30. A second receptacle 38 is also provided in the base 30 with a recess 40 that generally untapered with an arcuate profile, spaced apart from, and facing the first recess 36. The receptacles 34, 38 are aligned in a vertical direction of the hardware 22 so for vertical alignment of the hardware 22 once installed.

Figure 3:
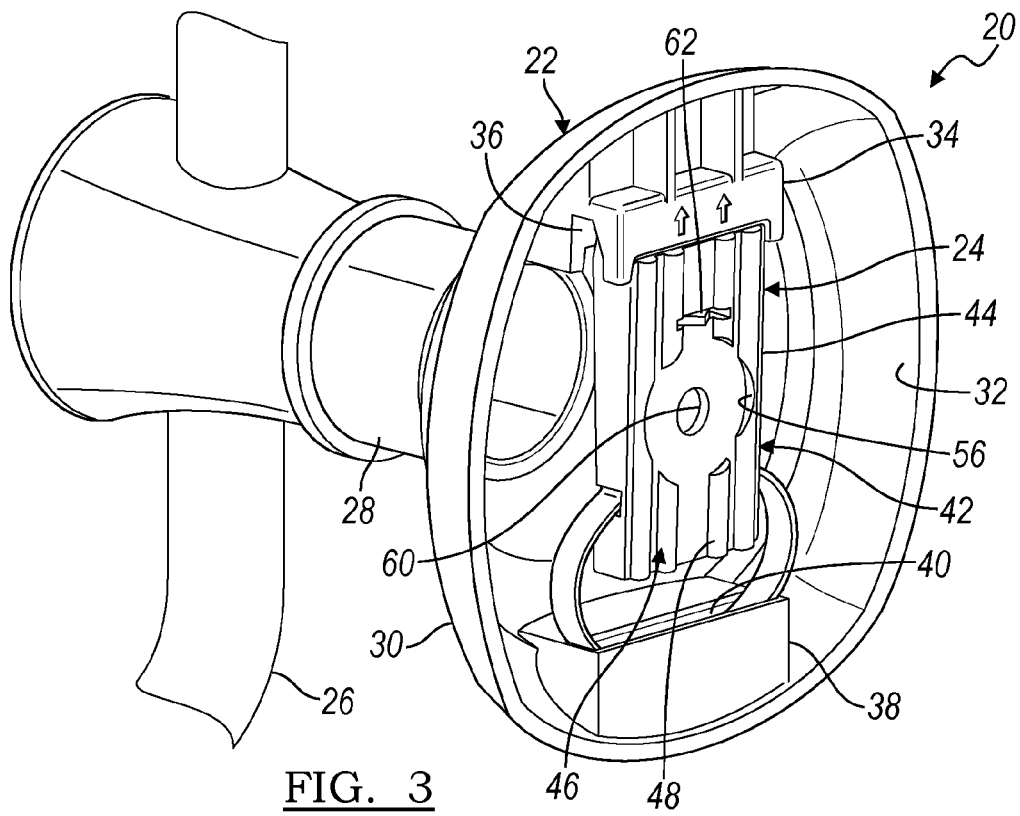
FIG. 3 is a rear perspective view of the hardware assembly of FIG. 1.
Figure 4:
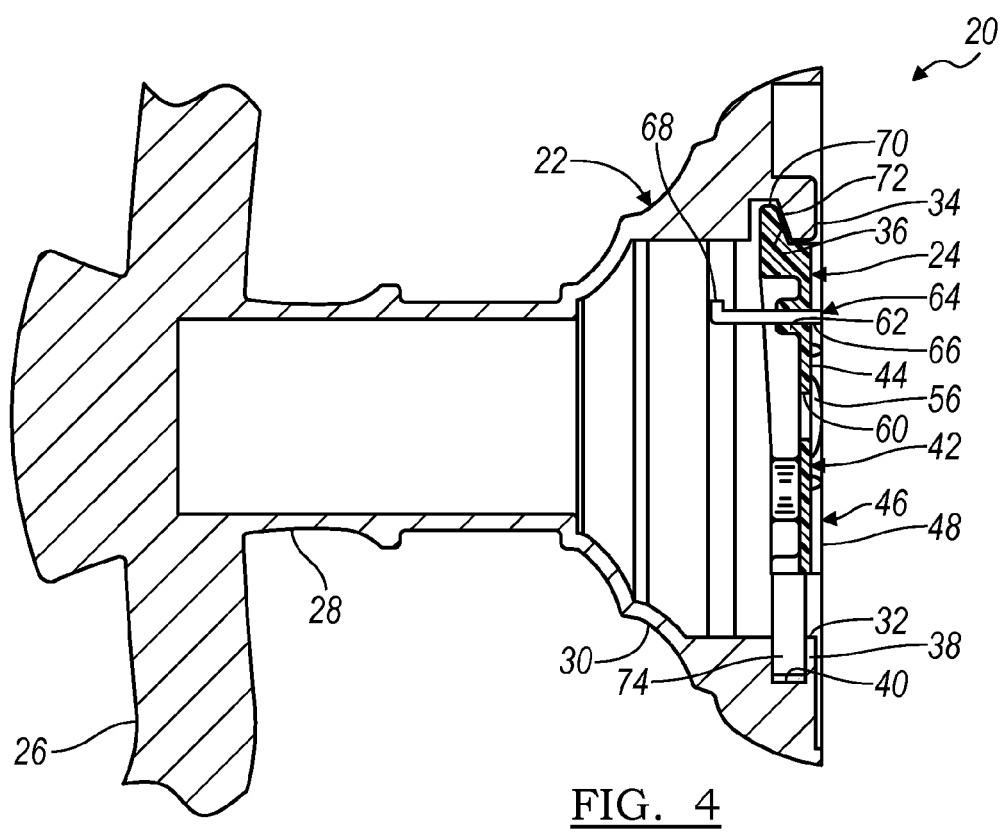
FIG. 4 is a partial section side view of the hardware assembly of FIG. 1.
Figure 5:
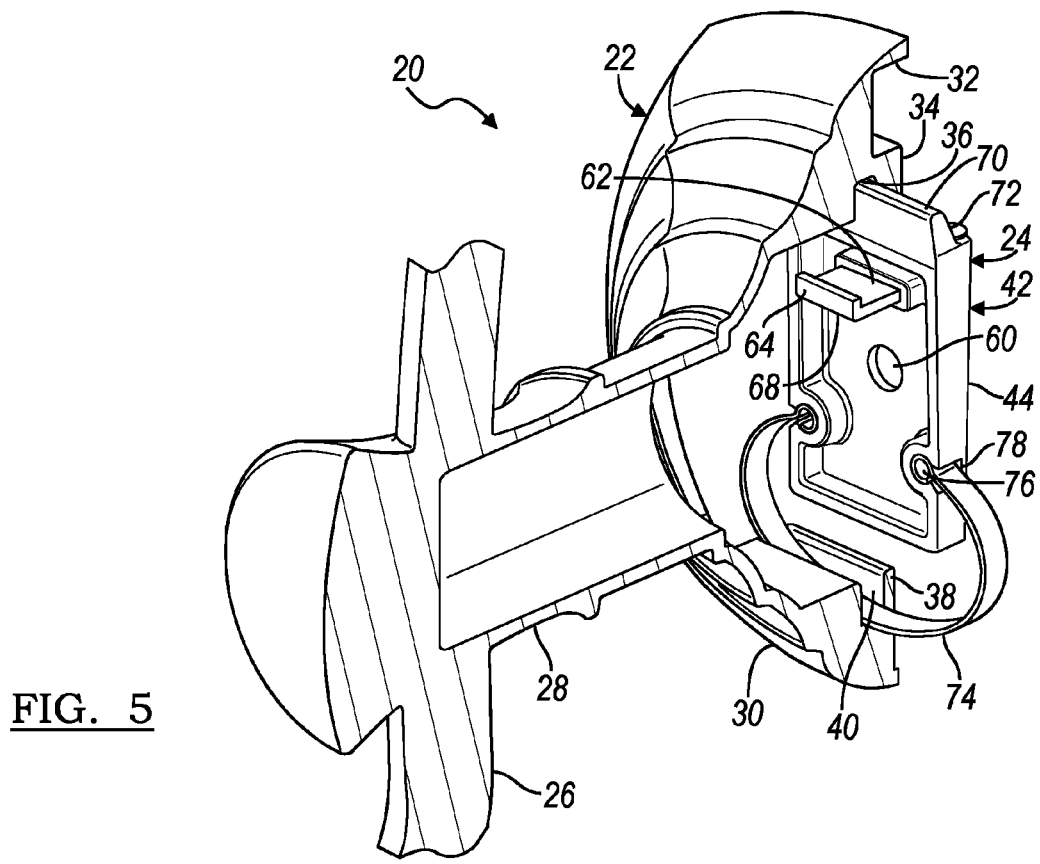
FIG. 5 is a partial section perspective view of the hardware assembly of FIG. 1.

Referring now to FIGS. 1 and 3-5, the hardware mounting assembly 24 includes a bracket 42. The bracket 42 has a body 44, which may be formed from a metallic alloy, such as a zinc alloy, for example. The body 44 has a mounting surface 46 for engaging the support surface. The mounting surface 46 may be generally planar for mating with the wall. For the depicted embodiment, FIG. 3 illustrates a plurality of longitudinal projections or ribs 48 extending from the mounting surface for collectively providing a planar contact through a plurality of line contacts each provided by one of the ribs 48. In comparison to an area contact, the plurality of line contacts reduces friction for assisting alignment of the bracket 42 during installation. Alternatively, the ribs 48 may be inserted into the wall by pressing the bracket 42 in order to temporarily fasten the bracket 42 to the support surface. Additionally, the ribs 48 provide traction to inhibit rotation of the hardware mounting assembly 24, and consequently the hardware 22, relative to the wall.

With reference again to FIG. 1, the hardware mounting assembly 24 may include a fastener assembly 50, such as an expansion anchor. The anchor 50 may include an expansion sleeve 52 with a flange 54 that rests upon the wall as the sleeve 52 is inserted into the wall. Accordingly, appropriate clearance for the flange 54 is provided within a pocket 56 in the ribs 48 as illustrated in FIG. 3. In FIG. 1, the anchor 50 includes a threaded fastener 58 which extends through a round aperture 60 in the bracket body 44. The threaded fastener 58 fastens the bracket 42 to the sleeve 52 thereby expanding the sleeve 52 and locking the sleeve 52 within the wall. The sleeve 52 may be used for fastening to drywall, tiles, plaster and other materials that support compressive loading. Alternatively, the threaded fastener 58 can be used without the sleeve 52 for fastening the bracket 42 directly to a support surface such as paneling, a stud or the like.

Figure 6:
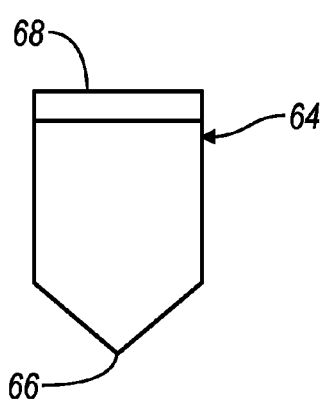
FIG. 6 is a top plan view of a fastener of the hardware assembly of FIG. 1.
Figure 7:
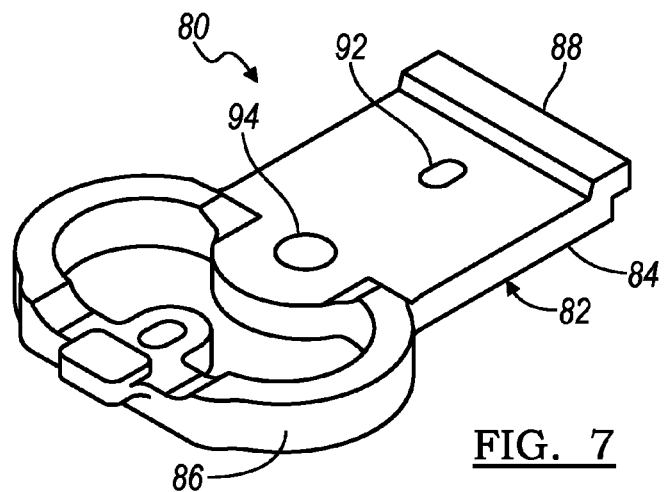
FIG. 7 is a perspective view of a hardware mounting bracket according to another embodiment.
Figure 8:
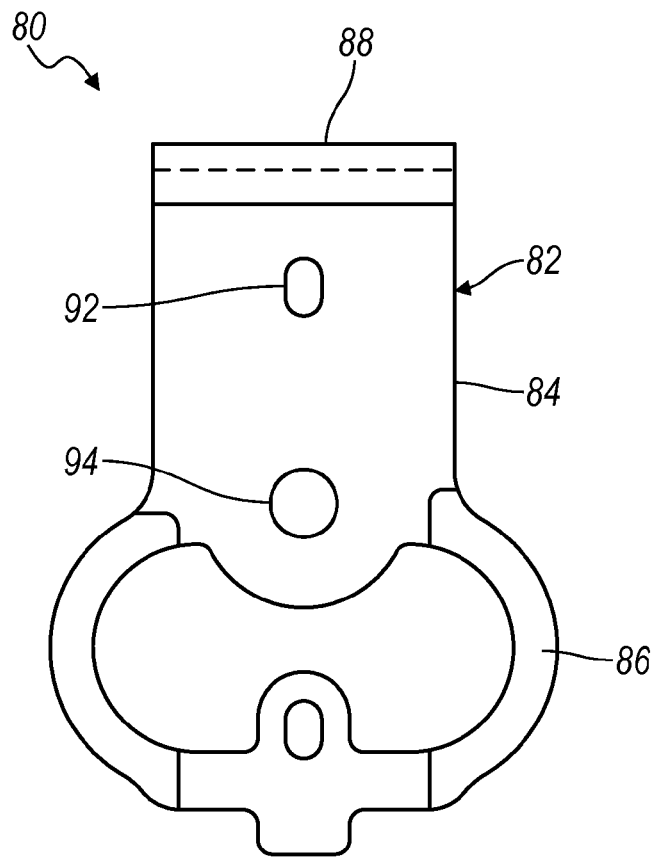
FIG. 8 is a front elevation view of the hardware mounting bracket of FIG. 7.
Figure 10:
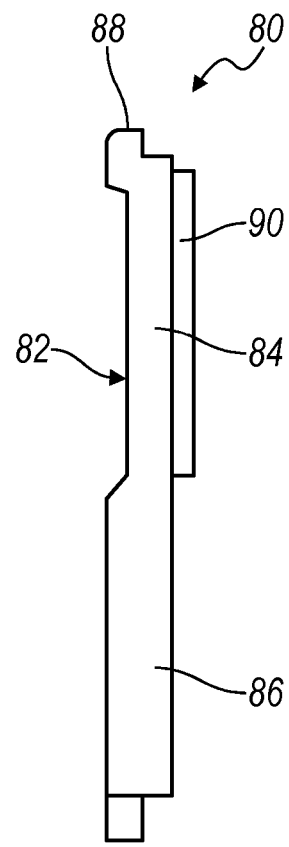
FIG. 10 is a side elevation view of the hardware mounting bracket of FIG. 7.
Figure 9:
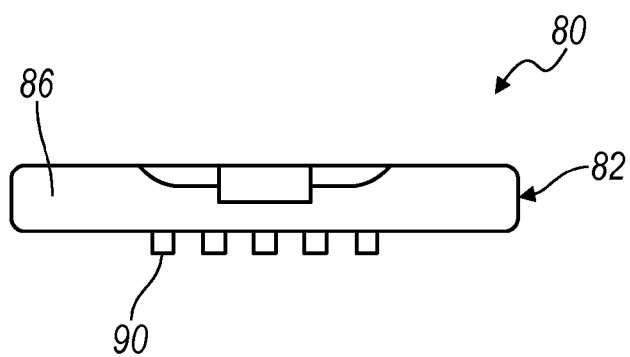
FIG. 9 is a bottom end view of the hardware mounting bracket of FIG. 7.

Referring again to FIGS. 1, and 3-5, a rectangular aperture 62 may be formed through the body 44. A tack 64 may also be provided for being received within the aperture 62. The tack 64 is also illustrated in FIG. 6 and can be formed from sheet metal with a point 66 for piercing the support surface. The tack 64 also includes a bent portion forming a head 68 for engaging the bracket body 44. Referring back to FIGS. 1, and 3-5, the tack 64 is utilized for fastening the bracket body 44 to the wall. The tack 64 may be utilized for additional fastening in combination with the fastener assembly 50. The two fastener 50, 64 combination inhibits rotation of the hardware mounting assembly 24 and the hardware 22. Additionally, the tack 64 may be employed for convenient one-handed fastening of the hardware mounting assembly 24 once aligned by manually pressing the head 68 against the bracket body 44. The tack 64 can secure the body 44 against the wall to free the installer's hand(s) for subsequent fastening with the fastener assembly 50.

The bracket 42 includes a first retainer 70 extending from the bracket body 44. The first retainer 70 is rigid and is narrower than the body 44. The first retainer 70 is tapered relative to the body 44 for receipt within the first recess 36 of the base 30. The tapered engagement urges the base 30 against the wall for firm mounting. The first retainer 70 provides a recess 72 between the first retainer 70 and the support surface for receiving a portion of the first receptacle 34 therein for providing an interlocking engagement.

A second retainer 74 extends from another end of the bracket body 44. The second retainer 74 is an elongate leaf spring that is received within the second recess 40. The leaf spring 74 has a pair of bent enlarged ends 76, each received in one of a pair of receptacles 78 in the bracket body 44. The leaf spring 74 is arcuate and forms a profile of an ellipse extending from each lateral side of the body 44 and wrapping about the end of the body 44. The recesses 36, 40 are spaced in the base 30 such that the leaf spring 74 is under compression once assembled to load the base 30 such that the tapered recess 36 is forced against the tapered retainer 70. Additionally, the leaf spring 74 and the arcuate recess 40 permit a surface contact for distributing the load from the leaf spring 74. By providing an area contact, as opposed to a point contact of the prior art, a secure connection is provided that is loaded to inhibit rattling or other unwanted movement of the hardware 22 relative to the bracket 42. Additionally the leaf spring 74 directly contacts the base 30 to eliminate additional components while further preventing any rattling or unwanted movement between interconnected components. According to at least another embodiment, more than one leaf spring 74 is provided, such as two leaf springs 74. According to another embodiment the second retainer 74 is provided by two leaf springs 74, which may be offset, coterminous, or otherwise suitably arranged.

Thus, the hardware mounting assembly 24 of the hardware assembly 20 provides a simplified mounting system. Optionally, the user installs the expansion sleeve 52. The user aligns the bracket 42 along the wall and presses the tack 64 into the wall. The user fastens the threaded fastener 58 to the wall or the sleeve 52. The user places the second recess 40 of the hardware 20 upon the leaf spring 74 of the bracket 42. The user slides the base 30 of the hardware 20 upward, compressing the leaf spring 74 until the first recess 36 is above the first retainer 70. Once the first retainer 70 aligns with the first recess 36, the base 30 is pivoted against the wall. The leaf spring 74 expands within the second recess 40 thereby pressing the first recess 36 into engagement with the first retainer 70. The base 30 conceals the hardware mounting assembly 24 without any exposed fasteners, such as set screws which are viewable in some prior art designs.

Additionally, the hardware 22 can be uninstalled without use of tools. The user slides the base 30 upward, compressing the leaf spring 74. The user pivots an upper end of the base 30 away from the first retainer 70. Then the user slides the base 30 down, expanding the leaf spring 74 and subsequently disengaging the second recess 72 from the leaf spring 74. Then the user removes the hardware 22 from the mounting assembly 24.

The leaf spring 74 provides a continuous load directly across a surface to provide a secure mounting that minimizes unwanted movement. The hardware 22 can be removed and reinstalled multiple times without loss of function.

FIGS. 7-10 illustrate a hardware mounting assembly 80 according to another embodiment for use with the hardware 22. The hardware mounting assembly 80 includes an integrally formed bracket 82, with both a bracket body 84 and leaf spring 86. The hardware mounting assembly 80 is formed from a polymeric material that is rigid enough to provide the bracket body 84 with a first narrowed retainer 88. The hardware mounting assembly 80 is formed from a polymeric material that is also resilient enough to provide the leaf spring 86. Similar to the prior embodiment, the bracket body 84 includes an array of ribs 90 formed lengthwise on a back surface for alignment and traction. Additionally apertures 92, 94 are formed through the bracket body 84 for receipt of fasteners for fastening the bracket 82 to a support surface. The integral polymeric bracket 82 provides a simplified, low cost alternative hardware mounting assembly 80.

Figure 11:
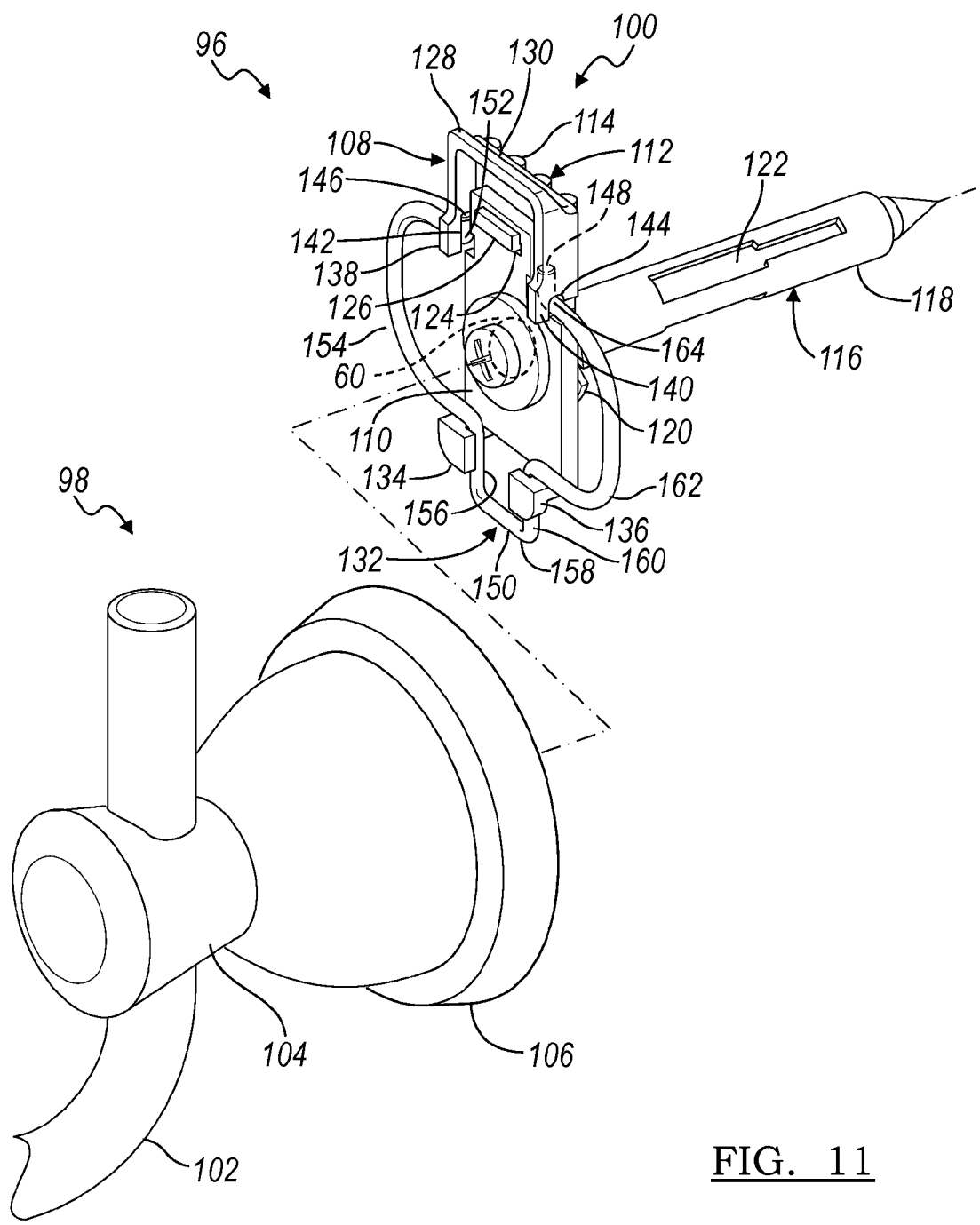
FIG. 11 is an exploded perspective view of a hardware assembly according to another embodiment.
Figure 12:
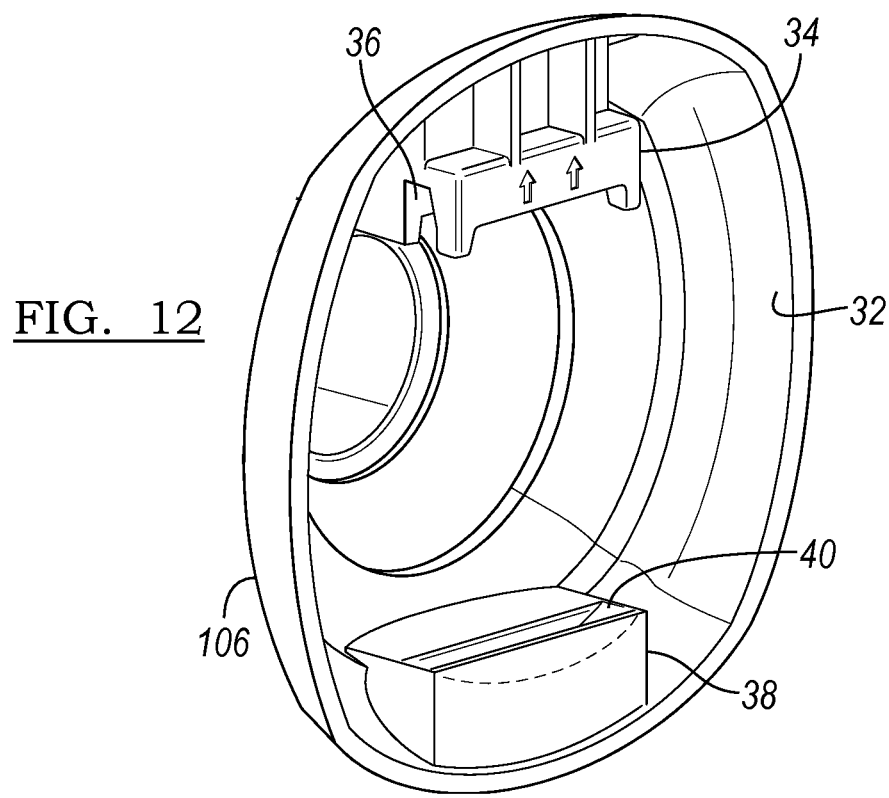
FIG. 12 is a rear perspective view of a base of the hardware assembly of FIG. 11.

FIG. 11 illustrates a hardware assembly 96 according to another embodiment, including hardware 98 and a hardware mounting assembly 100. The hardware 98 depicted includes a hook 102 with a post 104 and a base 106. As in prior embodiments, the base 106 has a cavity formed therein for receiving and concealing the hardware mounting assembly 100 as illustrated in FIG. 12 with reference numerals corresponding to the description of a prior embodiment. The base 106 includes a pair of spaced apart receptacles also.

The hardware mounting assembly 100 includes a bracket 108. The bracket 108 has a body 110, which may be formed from a metallic alloy, such as a zinc alloy, for example. The body 110 has a mounting surface 112 for engaging the support surface. The mounting surface 112 may be generally planar for mating with the wall. A plurality of longitudinal projections or ribs 114 extend from the mounting surface 112 for contacting the support surface.

Figure 13:
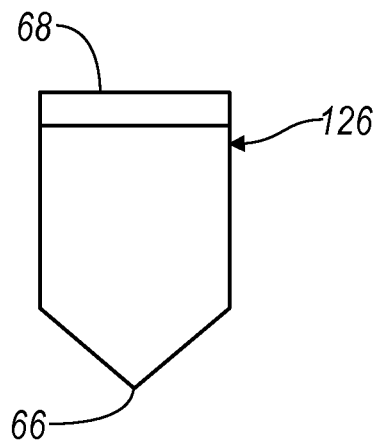
FIG. 13 is a top plan view of a fastener of the hardware assembly of FIG. 11.

The hardware mounting assembly 100 may include an expansion anchor 116. The anchor 116 may include an expansion sleeve 118 with a flange 120 that rests upon the wall as the sleeve 118 is inserted into the wall. The anchor 116 includes a threaded fastener 122 which extends through an aperture 60 in the bracket body 110. A rectangular aperture 124 may be formed through the body 110. A tack 126 is depicted in FIG. 13 with reference numerals corresponding to a prior embodiment. The tack 126 may also be provided for being received within the aperture 124 for piercing the support surface, and for fastening the bracket body 110 to the wall.

The bracket 108 includes a first retainer 128 extending from the bracket body 110. The first retainer 128 is rigid and is narrower than the body 110. The first retainer 128 is tapered relative to the body 110 for receipt within the first recess of the base 106. The tapered engagement urges the base 106 against the wall for firm mounting. The first retainer 128 provides a recess 130 between the first retainer 128 and the support surface for receiving a portion of the first receptacle therein for providing an interlocking engagement.

A second retainer 132 extends from another end of the bracket body 110. The second retainer 132 is an elongate leaf spring that is received within the second recess. The bracket body 110 includes a pair of laterally spaced apart guides 134, 136 extending from the bracket body 110. As depicted in FIG. 11, each of the pair of guides 134, 136 defines a recess having a substantially vertical axis. A pair of laterally spaced apart sidewalls 138, 140 extends from the bracket body 110. The pair of sidewalls 138, 140 is spaced apart from the guides 134, 136. A groove 142, 144 is formed through each sidewall 138, 140 to face one of each of the pair of guides 134, 136. As depicted in FIG. 11, each of the grooves 142, 144 has a substantially horizontal axis generally perpendicular to the substantially vertical axis of each recess defined by each of the pair of guides 134, 136.

The leaf spring 132 has a first end 146 received within one 142 of the grooves 142, 144, and a second end 148 received within the other groove 144. An intermediate region 150 extends between the pair of guides 134, 136 to engage the second recess. A first bend 152 is provided at the first end 146 of the leaf spring 132 to extend the first end 146 into the groove 142. A first arcuate portion 154 extends from the first end 146. A first straight portion 156 extends from the first arcuate portion 154 into engagement with one 134, of the pair of guides 134, 136. An intermediate portion 158 extends from the first straight portion 156 in the intermediate region 150. A second straight portion 160 extends from the intermediate portion 158 into engagement with the other guide 136. A second arcuate portion 162 extends from the second straight portion 160 to the second end 148. A second bend 164 is provided at the second end 148. The leaf spring 132 is under compression once assembled to load the base 106. During installation, application of a force from the base 106 to the intermediate portion 158 translates the first and second straight portions 156, 160 within the pair of guides 134, 136, thereby compressing the first and second arcuate portions 154, 162.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A hardware mounting assembly comprising:
   a hardware mounting bracket comprising:
      a bracket body adapted to be mounted to a support surface, wherein an aperture is formed through a mounting surface of the bracket body,
      a rigid retainer provided on one end of the bracket body to receive hardware supported thereon,
      at least one elongate biasing retainer provided on another end of the bracket body spaced apart from the rigid retainer, to engage the hardware supported thereon and to provide a loaded surface contact with the hardware supported thereon, and
      at least one projection extending from the mounting surface of the bracket body to engage the support surface,
      wherein the bracket body further comprises:
         a pair of laterally spaced apart guides extending from the bracket body, each of the pair of guides defining a recess having a substantially vertical axis, and
         a pair of laterally spaced apart sidewalls extending from the bracket body, the pair of sidewalls being spaced apart from the pair of guides with a groove formed through each sidewall, each of the grooves facing one of the pair of guides and having a substantially horizontal axis generally perpendicular to the substantially vertical axis of each recess,
      wherein the at least one elongate biasing retainer has a first end received within a first one of the grooves, a second end received within a second one of the grooves, and an intermediate region extending between the pair of guides to engage the hardware; and a fastener received through the aperture to fasten the mounting surface of the hardware mounting bracket to the support surface.

2. The hardware mounting assembly of claim 1 wherein the hardware mounting bracket further comprises an array of projections extending from the mounting surface.

3. The hardware mounting assembly of claim 2 wherein each projection in the array of projections extends in a direction along the bracket body from the rigid retainer to the at least one elongate biasing retainer.

4. The hardware mounting assembly of claim 2 wherein the array of projections provides a plurality of parallel line contacts only to provide traction to inhibit rotation of the hardware mounting assembly.

5. The hardware mounting assembly of claim 1 wherein the at least one elongate biasing retainer further comprises:
a first bend at the first end;
a first arcuate portion extending from the first end;
a first straight portion extending from the first arcuate portion into engagement with a first one of the pair of guides;
an intermediate portion extending from the first straight portion in the intermediate region;
a second straight portion extending from the intermediate portion into engagement with a second one of the pair of guides;
a second arcuate portion extending from the second straight portion to the second end; and
a second bend at the second end.

6. The hardware mounting assembly of claim 5 wherein application of a force to the intermediate portion translates the first and second straight portions within the pair of guides, thereby compressing the first and second arcuate portions.

7. The hardware mounting assembly of claim 1 wherein the rigid retainer comprises a narrow retainer extending from the bracket body providing a recess adjacent the narrow retainer.

8. The hardware mounting assembly of claim 1 wherein the fastener comprises a threaded fastener.

9. The hardware mounting assembly of claim 1 wherein the fastener comprises a tack.

10. The hardware mounting assembly of claim 9 wherein the aperture is generally rectangular with a width greater than a thickness, the thickness being oriented in a direction from the rigid retainer to the at least one elongate biasing retainer; and
wherein the tack is formed from sheet metal with a flat body with a point, and a bent portion forming a head to engage the bracket body.

11. The hardware mounting assembly of claim 10 wherein the bracket body includes a round aperture formed therethrough.

12. The hardware mounting assembly of claim 11 further comprising a threaded fastener extending through the round aperture.

13. A hardware assembly comprising:
a hardware mounting assembly according to claim 1; and
a hardware mounting base having a cavity to receive the bracket body, with a first recess formed within the hardware mounting base sized to receive the rigid retainer, and a second recess formed within the hardware mounting base sized to receive the at least one elongate biasing retainer, to mount the hardware mounting base to the hardware mounting assembly and to conceal the hardware mounting assembly.

14. The hardware assembly of claim 13 further comprising a hook extending from the hardware mounting base.

15. A hardware assembly comprising:
a hardware mounting assembly according to claim 1; and
a hardware mounting base with a cavity to receive the bracket body, with a first recess formed within the hardware mounting base sized to receive the rigid retainer, and a second recess formed within the hardware mounting base sized to receive the intermediate region of the at least one elongate biasing retainer, to mount the hardware mounting base to the hardware mounting assembly and to conceal the hardware mounting assembly.

16. The hardware assembly of claim 15 further comprising a hook extending from the hardware mounting base.

17. A hardware assembly comprising:
a bracket body adapted to be mounted to a support surface;
a rigid retainer provided on one end of the bracket body to receive hardware supported thereon;
at least one elongate biasing retainer provided on another end of the bracket body spaced apart from the rigid retainer, to engage the hardware supported thereon and to provide a loaded surface contact with the hardware supported thereon;
wherein the bracket body further comprises:
a pair of laterally spaced apart guides extending from the bracket body, each of the pair of guides defining a recess having a substantially vertical axis, and
a pair of laterally spaced apart sidewalls extending from the bracket body, the pair of sidewalls being spaced apart from the pair of guides with a groove formed through each sidewall, each of the grooves facing one of the pair of guides and having a substantially horizontal axis generally perpendicular to the substantially vertical axis of each recess;
wherein the at least one elongate biasing retainer has a first end received within a first one of the grooves, a second end received within a second one of the grooves, and an intermediate region extending between the pair of guides to engage the hardware;
a hardware mounting base with a cavity to receive the bracket body, with a first recess formed within the hardware mounting base sized to receive the rigid retainer, and with a second recess formed within the hardware mounting base sized to receive the intermediate region of the at least one elongate biasing retainer, to mount the hardware mounting base to the bracket body and to conceal the bracket body; and
a hook extending from the hardware mounting base.

18. The hardware assembly of claim 17 wherein the at least one elongate biasing retainer further comprises:
a first bend at the first end;
a first arcuate portion extending from the first end;
a first straight portion extending from the first arcuate portion into engagement with a first one of the pair of guides;
an intermediate portion extending from the first straight portion in the intermediate region;
a second straight portion extending from the intermediate portion into engagement with a second one of the pair of guides;
a second arcuate portion extending from the second straight portion to the second end; and
a second bend at the second end.

* * * * *